March 1, 1932.  C. S. WRIGHT  1,847,912
REVERSING MECHANISM
Filed June 29, 1929
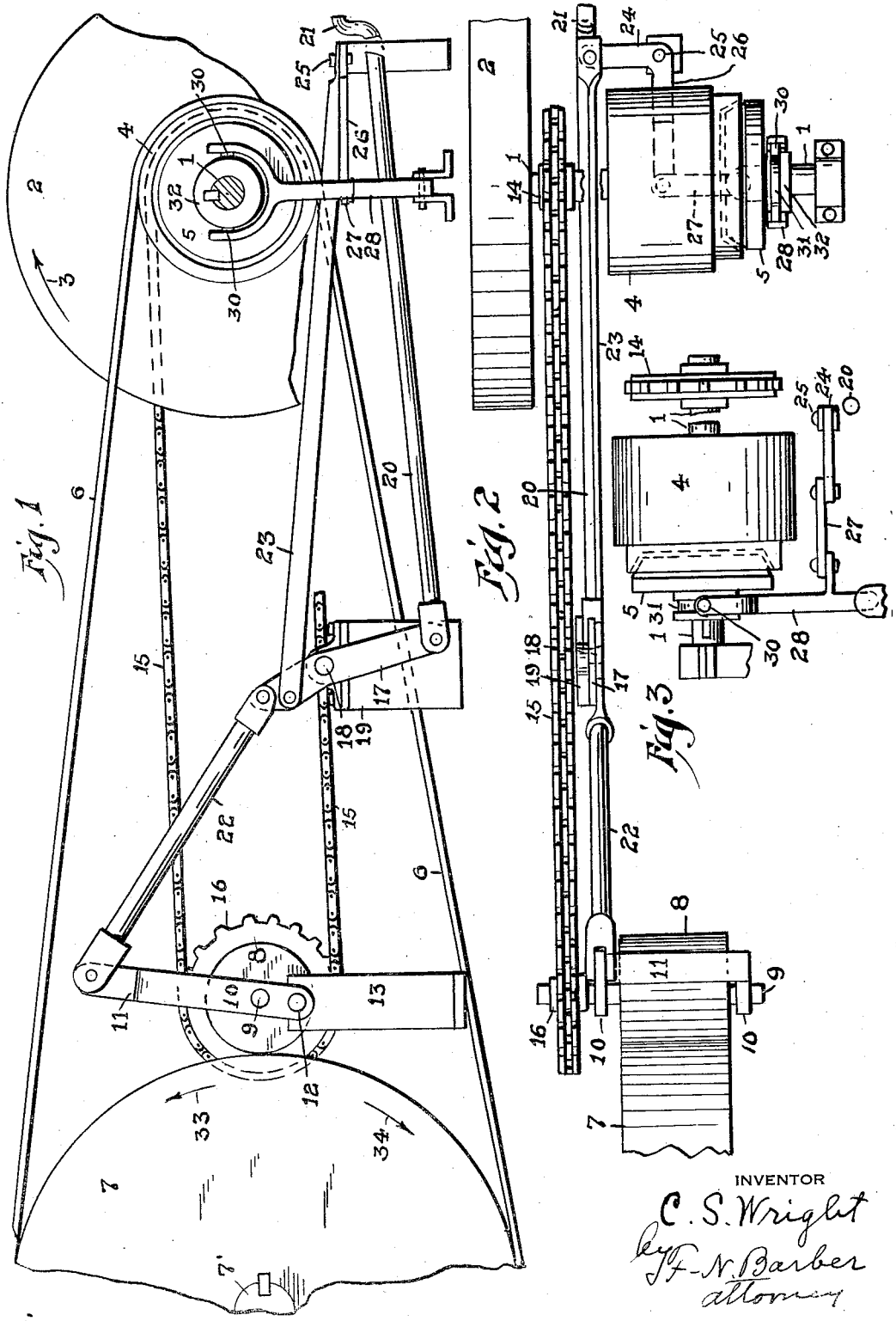
INVENTOR
C. S. Wright
by H. N. Barber
Attorney Patented Mar. 1, 1932

1,847,912

UNITED STATES PATENT OFFICE

CLYDE S. WRIGHT, OF TOLEDO, OHIO

REVERSING MECHANISM

Application filed June 29, 1929. Serial No. 374,907.

My invention relates to reversing mechanisms designed particularly for hoists, but they may be applied to various other types of apparatus.

It is the object of this invention to provide a reversing mechanism which is simple in operation and relatively cheap to manufacture.

Referring to the accompanying drawings, Fig. 1 is a side elevation of my invention, some parts being omitted and some parts being broken away. Fig. 2 is a plan view of Fig. 1. Fig. 3 is an end elevation of Fig. 1, parts being omitted and broken away.

On the drawings, 1 designates a shaft which while the apparatus is in use is rotated continuously in one direction by the band-wheel 2, it being assumed that the band-wheel rotates in the direction indicated by the arrow 3. 4 is a pulley loose on the shaft 1 being connectable thereto by means of the clutch 5 here shown to be of the cone type, but any other suitable type of clutch may be substituted therefor. The pulley 4 is connected by the belt 6 to the band-wheel 7 which is the particular mechanism to be reversed. This band-wheel 7 may be used to drive any suitable selected apparatus in either direction at the will of the operator and is shown keyed to the driven shaft 7'.

8 is a friction cylinder or drum mounted on the shaft 9 carried by the side members 10 of the frame 11, the lower ends of the members 10 swinging on the pivot 12 mounted in the fixed block 13.

The shaft 1 has thereon the sprocket wheel 14 which is connected by the sprocket chain 15 to the sprocket wheel 16 carried by the shaft 9.

17 is an upstanding lever pivoted between its ends on the pivot 18 carried by the fixed block 19 betwen the shafts 1 and 9. The lower end of the lever 17 is pivotally connected to the operating rod 20 which may be pushed or pulled longitudinally by the operator by means of the handle 21 or other suitable means. The upper end of the lever 17 is pivotally connected to one end of the link 22, the other end of the link being pivotally connected to the upper end of the frame 11. The upper end of the lever 17 is also pivotally connected to one end of the link 23, the remaining end of the link being pivotally connected to one arm of the bell-crank lever 24 which is pivoted at its angle on the pivot 25. The arm 26 of the bell-crank lever is pivotally connected to one end of the link 27, the other end of the link being pivotally connected to the clutch operating lever 28. The lever 28 is pivoted at its lower end and has at its upper end the usual fork for operating the clutch 5, the fork having the pins 30 in the groove 31 in the hub 32 of the clutch 5.

The drawings show the friction drum 8 in driving contact with the periphery of the band-wheel 7, and the clutch 5 disconnected from the pulley 4. These positions of the friction drum 8 and the clutch 5 are brought about by pulling the operating rod 20 to the right. This movement of the operating rod causes the lever 17 to rock counterclockwise so that the link 22 operates the frame 11 to bring the friction drum 8 against the band-wheel 7. At the same time the link 23 moves toward the left and causes the bell-crank lever and the link 27 and the lever 28 to open the clutch 5. The pulley 4 is now idle on the shaft. The sprocket chain 15 drives the friction drum 8 causing the band-wheel to rotate counterclockwise as shown by the arrow 33. The band-wheel 7 causes the belt 6 to run on the pulley 4 which has no effect on the shaft 1 owing to the open condition of the clutch 5.

When the operating rod 20 is pushed to the left, the lever 17 causes the link 22 to operate the frame 11 so as to move the friction drum out of contact with the band-wheel 7 and at the same time causes the link 23 and the parts connected thereto to move the clutch 5 into engagement with the pulley 4. The pulley 4 being now interlocked with the shaft 1 causes the belt 6 to rotate the band-wheel 7 clockwise as indicated by the arrow 34.

It is thus seen that by the simple movement of the rod 20 the band-wheel can be driven in either direction at the will of the operator.

The reversing mechanism shown and described is especially advantageous for use with drill lines, sand lines, casing lines, and other elements used in connection with the drilling of wells. It is particularly advantageous since by its friction driving it avoids severe jolts and jars on the various parts thereof.

I claim:

1. In a reversing mechanism, a driving shaft, a pulley loose thereon, a clutch connection between the shaft and the pulley, a driven shaft, a pulley secured thereto, a driving means between the pulleys to drive the driven shaft in one direction, a second driven shaft, a driving means between the driving shaft and the second driven shaft, a releasable driving connection between the two driven shafts for driving the second driven shaft in the other direction, and means for simultaneously establishing either connection and disconnecting the other connection.

2. In a reversing mechanism, a driving shaft, a pulley loose thereon, a clutch connection for connecting the shaft and the pulley, a driven shaft, a pulley secured thereto, a driving means between the pulleys, a second driving shaft, a friction driving connection thereon movable into contact with the periphery of the second pulley, a driving means between the two driving shafts, and means for simultaneously establishing either connection and disconnecting the other connection.

3. In a reversing mechanism, a driving shaft, a pulley loose thereon, a clutch connection between the shaft and the pulley, a driven shaft, a pulley thereon, a driving means connecting the two pulleys to drive the driven shaft in one direction when the first pulley is clutched to the driving shaft, a second driven shaft driven from the driving shaft, a friction connection between the second pulley and the second driven shaft, and means for simultaneously establishing either connection and disconnecting the other connection.

In testimony whereof, I hereunto affix my signature.

CLYDE S. WRIGHT.